(12) United States Patent
Panikkar et al.

(10) Patent No.: US 11,782,934 B2
(45) Date of Patent: Oct. 10, 2023

(54) CONTROLLING MONITORING ROLES OF NODES IN A MONITORING SYSTEM UTILIZING A TIME-BASED RANKING OF THE NODES

(71) Applicant: Dell Products L.P., Round Rock, TX (US)

(72) Inventors: Shibi Panikkar, Bangalore (IN); Pratheek Veluswamy, Bangalore (IN); Robert A. Lincourt, Jr., Franklin, MA (US); Ravi Prakash Kulkarni, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/573,141

(22) Filed: Jan. 11, 2022

(65) Prior Publication Data
US 2023/0222130 A1 Jul. 13, 2023

(51) Int. Cl.
*G06F 16/27* (2019.01)
*G06F 16/2457* (2019.01)

(52) U.S. Cl.
CPC ........ *G06F 16/24578* (2019.01); *G06F 16/27* (2019.01)

(58) Field of Classification Search
CPC ....................................................... G06F 16/27
See application file for complete search history.

(56) References Cited

U.S. PATENT DOCUMENTS

| | | | | |
|---|---|---|---|---|
| 2005/0228947 A1* | 10/2005 | Morita | ............... | G06F 11/2025 711/114 |
| 2012/0191835 A1* | 7/2012 | Blackburn | .......... | H04L 41/0896 709/223 |
| 2013/0097321 A1* | 4/2013 | Tumbde | .............. | H04L 67/1008 709/226 |
| 2014/0129715 A1* | 5/2014 | Mortazavi | ............. | G06F 9/5083 709/226 |

(Continued)

OTHER PUBLICATIONS

Datastax, Inc. "DSE OpsCenter 6.8 User Guide," Latest OpsCenter version, Latest 6.8 patch: 6.8.12, Jul. 7, 2021, 731 pages.
R. Taft et al., "CockroachDB: The Resilient Geo-Distributed SQL Database," Symposium on Principles of Database Systems, Jun. 14-19, 2020, pp. 1493-1509.

(Continued)

*Primary Examiner* — Robert W Beausoliel, Jr.
*Assistant Examiner* — Pedro J Santos
(74) *Attorney, Agent, or Firm* — Ryan, Mason & Lewis, LLP

(57) ABSTRACT

An apparatus comprises at least one processing device configured to, in a monitoring system in which at any given time at least one monitoring node has a primary monitoring role responsible for monitoring operation of system nodes of a distributed system and other monitoring nodes have a secondary monitoring role responsible for monitoring operation of the at least one monitoring node having the primary monitoring role, identify a first monitoring node having the primary monitoring role at a current time. The processing device is also configured to determine, based at least in part on a time-based ranking of the monitoring nodes, a second monitoring node having the secondary monitoring role at the current time to transition to the primary monitoring role, and (Continued)

to transition the second monitoring node to the primary monitoring role at a subsequent time.

20 Claims, 14 Drawing Sheets

(56) References Cited

U.S. PATENT DOCUMENTS

| | | | | |
|---|---|---|---|---|
| 2014/0280899 A1* | 9/2014 | Brewster, Jr. | ....... | H04L 43/0817 709/224 |
| 2016/0203062 A1* | 7/2016 | Hapse | ................ | G06F 11/2035 714/15 |
| 2019/0188309 A1* | 6/2019 | Anderson | ............... | G06F 3/065 |

OTHER PUBLICATIONS

Nagios, "Nagios XI: How to Monitor Apache Cassandra Distributed Databases," https://www.nagios.com/, Feb. 2018, 14 pages.
Dell Technologies, "APEX: Simplified Cloud Experiences that Deliver more Agility and Control," https://www.delltechnologies.com/en-us/apex/index.htm, Jul. 2020, 9 pages.
Dell Technologies, "APEX Private Cloud and APEX Hybrid Cloud," Specification Sheet, Reference No. H18181, 2021, 10 pages.
Datastax, Inc. "DSE 6.8 Architecture Guide," Jan. 1, 2022, 129 pages.
Yugabytedb, "Distributed SQL Database for Retail," https://www.yugabyte.com/wp-content/uploads/2021/05/YB-Retail-Solution-Brief-R3.pdf, Accessed Jan. 7, 2022, 5 pages.
J. C. Corbett et al., "Spanner: Google's Globally-Distributed Database," Proceedings of Operating Systems Design and Implementation, Oct. 8-10, 2012, 14 pages.

* cited by examiner

200 — IN A MONITORING SYSTEM IN WHICH AT ANY GIVEN TIME AT LEAST ONE MONITORING NODE HAS A PRIMARY MONITORING ROLE RESPONSIBLE FOR MONITORING OPERATION OF SYSTEM NODES OF A DISTRIBUTED SYSTEM AND TWO OR MORE OTHER MONITORING NODE HAVE A SECONDARY MONITORING ROLE RESPONSIBLE FOR MONITORING OPERATION OF MONITORING NODES HAVING THE PRIMARY MONITORING ROLE, IDENTIFY A FIRST MONITORING NODE HAVING THE PRIMARY MONITORING ROLE AT A CURRENT TIME

202 — DETERMINE, BASED AT LEAST IN PART ON A TIME-BASED RANKING OF THE MONITORING NODES, A SECOND MONITORING NODE HAVING THE SECONDARY MONITORING ROLE AT THE CURRENT TIME TO TRANSITION TO THE PRIMARY MONITORING ROLE, THE TIME-BASED RANKING COMPRISING RANKINGS FOR EACH OF TWO OR MORE DIFFERENT TIME RANGES, THE RANKINGS BEING BASED AT LEAST IN PART ON (I) PROCESSING LOAD OF THE SYSTEM NODES IN THE TWO OR MORE DIFFERENT TIME RANGES AND (II) LATENCY BETWEEN RESPECTIVE ONES OF THE MONITORING NODES AND RESPECTIVE ONES OF THE SYSTEM NODES

204 — TRANSITION THE SECOND MONITORING NODE TO THE PRIMARY MONITORING ROLE AT A SUBSEQUENT TIME

CONTROLLING MONITORING ROLES OF NODES IN A MONITORING SYSTEM UTILIZING A TIME-BASED RANKING OF THE NODES

FIELD

The field relates generally to information processing, and more particularly to management of information processing systems.

BACKGROUND

Information technology infrastructure may include distributed systems in which information technology assets are deployed at various computing sites. Such distributed systems include distributed database systems, in which the information technology assets comprise databases or database nodes of a distributed database which are deployed in two or more different data centers or other computing sites. A distributed database system or other type of distributed system may have an associated monitoring system configured for monitoring the operation of the information technology assets that are part of the distributed system.

SUMMARY

Illustrative embodiments of the present disclosure provide techniques for controlling monitoring roles of monitoring nodes in a monitoring system based at least in part on a time-based ranking of the monitoring nodes.

In one embodiment, an apparatus comprises at least one processing device comprising a processor coupled to a memory. The at least one processing device is configured to perform the step of, in a monitoring system comprising a plurality of monitoring nodes in which at any given time at least one of the plurality of monitoring nodes has a primary monitoring role responsible for monitoring operation of a plurality of system nodes of a distributed system and two or more other ones of the plurality of monitoring nodes have a secondary monitoring role responsible for monitoring operation of said at least one of the plurality of monitoring nodes having the primary monitoring role, identifying a first one of the plurality of monitoring nodes having the primary monitoring role at a current time. The at least one processing device is also configured to perform the step of determining, based at least in part on a time-based ranking of the plurality of monitoring nodes, a second one of the plurality of monitoring nodes having the secondary monitoring role in the monitoring system at the current time to transition to the primary monitoring role, the time-based ranking of the plurality of monitoring nodes comprising rankings of the plurality of monitoring nodes for each of two or more different time ranges, the rankings being based at least in part on (i) processing load of the plurality of system nodes in each of the two or more different time ranges and (ii) latency between respective ones of the plurality of monitoring nodes and respective ones of the plurality of system nodes. The at least one processing device is further configured to perform the step of transitioning the second one of the plurality of monitoring nodes to the primary monitoring role at a subsequent time.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for controlling monitoring roles of monitoring nodes in a monitoring system based at least in part on a time-based ranking of the monitoring nodes in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
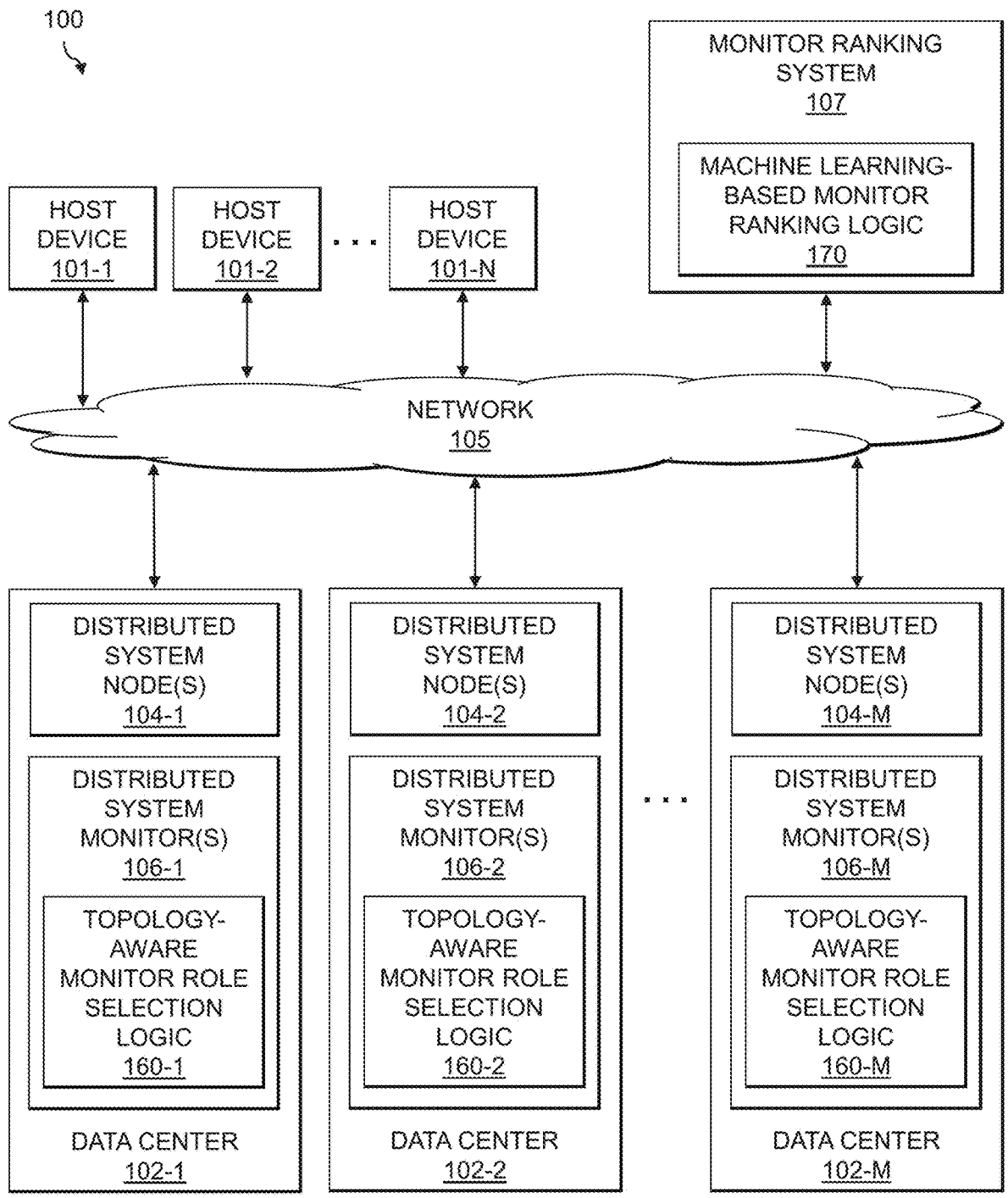
FIG. 1 is a block diagram of an information processing system configured for controlling monitoring roles of monitoring nodes in a monitoring system based at least in part on a time-based ranking of the monitoring nodes in an illustrative embodiment.

FIG. 1 shows an information processing system 100 configured in accordance with an illustrative embodiment for controlling monitoring roles of monitoring nodes in a monitoring system based at least in part on a time-based ranking of the monitoring nodes. The information processing system 100 comprises one or more host devices 101-1, 101-2, . . . 101-N (collectively, host devices 101) which communicate with one or more data centers 102-1, 102-2 ... 102-M (collectively, data centers 102) over a network 105. The data centers 102 each comprise one or more nodes of a distributed system 104-1, 104-2, ... 104-M (collectively, distributed system nodes 104). The distributed system may comprise, for example, a distributed database system with the distributed system nodes 104 comprising database nodes or instances in the distributed database system. The distributed system may also or alternatively describe a distributed computing system, a distributed storage system (e.g., a storage cluster), etc. More generally, the distributed system nodes 104 comprise information technology (IT) assets of an IT infrastructure which are distributed across multiple locations (e.g., the different data centers 102). Such IT assets may include physical and virtual computing resources. Physical computing resources may include physical hardware such as servers, storage systems, networking equipment, Internet of Things (IoT) devices, satellite devices, other types of processing and computing devices, etc. Virtual computing resources may include virtual machines (VMs), software containers (also referred to herein as containers), etc.

The host devices 101 are assumed to access or otherwise utilize the distributed system (e.g., by submitting transactions or processing requests that will be executed on or utilizing one or more of the distributed system nodes 104). The host devices 101 and the data centers 102 may be geographically distributed, such that there is different latency therebetween and also potentially different peak load times for different ones of the distributed system nodes 104 of the distributed system (e.g., at certain times of the day, some of the distributed system nodes 104 may be more active than others).

The host devices 101 and data centers 102 illustratively comprise respective computers, servers or other types of processing devices capable of communicating with one another via the network 105. At least a subset of the host devices 101 and the data centers 102 may be implemented as respective virtual machines of a compute services platform or other type of processing platform. The host devices 101 and the data centers 102 in such an arrangement illustratively provide compute services such as execution of one or more applications on behalf of each of one or more users associated with respective ones of the host devices 101.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The data centers 102 in the FIG. 1 embodiment also each comprise one or more distributed system monitor instances 106-1, 106-2, ... 106-M (collectively, distributed system monitors 106, which are examples of monitoring nodes of a monitoring system) implementing topology-aware monitor role selection logic 160-1, 160-2, ... 160-M (collectively, topology-aware monitor role selection logic 160). The distributed system monitors 106 collectively provide a monitoring system that monitors operation of the distributed system (e.g., the distributed system nodes 104). Generally, the monitoring system includes one of the distributed system monitors 106 that acts in a "primary" monitoring role for the distributed system, while other ones of the distributed system monitors 106 act in a secondary or backup monitoring role for the distributed system. It should be appreciated, however, that in some cases a monitoring system may include two or more distributed system monitors that act in the primary monitoring role. In various embodiments described below, it is assumed that the monitoring system has only a single distributed system monitor acting in the primary monitoring role and multiple other distributed system monitors acting in the secondary or backup monitoring role.

The primary one of the distributed system monitors 106 sends heartbeat messages at regular intervals to the secondary or backup ones of the distributed system monitors 106. In the event that the secondary or backup ones of the distributed system monitors 106 fail to receive a designated number of heartbeat messages from the primary one of the distributed system monitors 106, one of such secondary or backup ones of the distributed system monitors will take over the primary monitoring role. As will be described in further detail below, the topology-aware monitor role selection logic 160 provides for intelligent selection of which of the second or backup ones of the distributed system monitors 106 will take over the primary role in such situations. Further, the topology-aware monitor role selection logic 160 can enable intelligent movement of the primary role among the distributed system monitors 106 in accordance with time-based rankings (e.g., to reduce latency between the primary one of the distributed system monitors 106 and ones of the distributed system nodes 104 currently experiencing high load conditions).

While in the FIG. 1 embodiment each data center 102 includes both one or more distributed system nodes 104 and one or more distributed system monitors 106, this is not a requirement. In other embodiments, one or more of the data centers 102 may comprise only distributed system nodes or only distributed system monitor instances. Further, the particular number of distributed system nodes and distributed system monitor instances may vary from data center to data center. For example, there may be a first number of distributed system nodes 104-1 in the data center 102-1 and a second, different number of distributed system nodes 104-2 in the data center 102-2. Similarly, there may be a third number of distributed system monitor instances 106-1 in the data center 102-1 and fourth, different number of distributed system monitor instances 106-2 in the data center 102-2.

Also coupled to the network 105 is a monitor ranking system 107, which implements machine learning-based monitor ranking logic 170. The machine learning-based monitor ranking logic 170 is configured to utilize one or more machine learning algorithms to determine a time-based ranking of the distributed system monitors 106, based on various factors such as their latencies to different ones of the distributed system nodes 104, varying transaction or processing load on different ones of the distributed system nodes 104, etc. The machine learning-based monitor ranking logic 170 may periodically generate a snapshot of the time-based ranking of the distributed system monitors 106, with that snapshot being provided to each of the distributed system monitors 106.

Although shown as external to the host devices 101 and data centers 102 in the FIG. 1 embodiment, it should be appreciated that the monitor ranking system 107 may be implemented at least partially internal to one or more of the host devices 101 and/or one or more of the data centers 102, including on one or more of the distributed system monitors 106 thereof.

The topology-aware monitor role selection logic 160 is configured to utilize the time-based ranking of the distributed system monitors 106 to determine which of the distributed system monitors 106 should take on a primary monitoring role for the distributed system comprising the distributed system nodes 104, and which of the distributed system monitors 106 should take on secondary or backup monitoring roles for the distributed system comprising the distributed system nodes 104. The selection of the "primary" role may be performed when a current primary one of the distributed system monitors 106 goes down, or when at a given time the current primary one of the distributed system monitors 106 is not the highest-ranked one of the distributed system monitors 106.

At least portions of the functionality of the topology-aware monitor role selection logic 160 and the machine learning-based monitor ranking logic 170 may be implemented at least in part in the form of software that is stored in memory and executed by a processor.

The host devices 101, the data centers 102 and the monitor ranking system 107 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 101, the data centers 102 and the monitor ranking system 107 (or one or more components thereof such as the distributed system nodes 104, the distributed system monitors 106, the topology-aware monitor role selection logic 160, the machine learning-based monitor ranking logic 170) may be implemented on respective distinct processing platforms, although numerous other arrangements are possible. For example, in some embodiments at least portions of one or more of the host devices 101 and one or more of the data centers 102 are implemented on the same processing platform. Further, the monitor ranking system 107 can be implemented at least in part within at least one processing platform that implements at least a subset of the host devices 101 and/or the data centers 102.

The network 105 may be implemented using multiple networks of different types. For example, the network 105 may comprise a portion of a global computer network such as the Internet, although other types of networks can be part of the network 105 including a wide area network (WAN), a local area network (LAN), a satellite network, a telephone or cable network, a cellular network, a wireless network such as a WiFi or WiMAX network, a storage area network (SAN), or various portions or combinations of these and other types of networks. The network 105 in some embodiments therefore comprises combinations of multiple different types of networks each comprising processing devices configured to communicate using Internet Protocol (IP) or other related communication protocols.

The host devices 101, the data centers 102 and the monitor ranking system 107 in some embodiments may be implemented as part of a cloud-based system. The host devices 101, the data centers 102 and the monitor ranking system 107 can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks including network 105.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 101, the data centers 102 and the monitor ranking system 107 are possible, in which certain ones of the host devices 101 and the data centers 102 reside in a first geographic location while other ones of the host devices 101 and/or the data centers 102 reside in at least a second geographic location that is potentially remote from the first geographic location. The monitor ranking system 107 may be implemented at least in part in the first geographic location, the second geographic location, and one or more other geographic locations. Thus, it is possible in some implementations of the system 100 for different ones of the host devices 101, the data centers 102 and the monitor ranking system 107 to reside in different geographic locations. Numerous other distributed implementations of the host devices 101, the data centers 102 and the monitor ranking system 107 are possible.

Additional examples of processing platforms utilized to implement portions of the system 100 in illustrative embodiments will be described in more detail below in conjunction with FIGS. 13 and 14.

It is to be understood that the particular set of elements shown in FIG. 1 for controlling monitoring roles of monitoring nodes (e.g., distributed system monitors 106) in a monitoring system based at least in part on a time-based ranking of the monitoring nodes is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for controlling monitoring roles of monitoring nodes in a monitoring system based at least in part on a time-based ranking of the monitoring nodes will now be described in more detail with reference to the flow diagram of FIG. 2. It is to be understood that this particular process is only an example, and that additional or alternative processes for controlling monitoring roles of monitoring nodes in a monitoring system based at least in part on a time-based ranking of the monitoring nodes.

In this embodiment, the process includes steps 200 through 204. These steps are assumed to be performed by the distributed system monitors 106 and the monitor ranking system 107 utilizing the topology-aware monitor role selection logic 160 and the machine learning-based monitor ranking logic 170. The process is performed in a monitoring system comprising a plurality of monitoring nodes (e.g., distributed system monitors 106) in which at any given time at least one of the plurality of monitoring nodes has a primary monitoring role responsible for monitoring operation of a plurality of system nodes (e.g., distributed system nodes 104) of a distributed system and two or more other ones of the plurality of monitoring nodes have a secondary monitoring role responsible for monitoring operation of said at least one of the plurality of monitoring nodes having the primary monitoring role. The process begins with step 200, identifying a first one of the plurality of monitoring nodes having the primary monitoring role at a current time.

In step 202, based at least in part on a time-based ranking of the plurality of monitoring nodes, a second one of the plurality of monitoring nodes having the secondary monitoring role in the monitoring system at the current time to transition to the primary monitoring role is determined. The time-based ranking of the plurality of monitoring nodes comprises rankings of the plurality of monitoring nodes for each of two or more different time ranges, the rankings being based at least in part on (i) processing load of the plurality of system nodes in each of the two or more different time ranges and (ii) latency between respective ones of the plurality of monitoring nodes and respective ones of the plurality of system nodes. In step 204, the second one of the plurality of monitoring nodes is transitioned to the primary monitoring role at a subsequent time.

The distributed system may comprise a distributed database system, and the plurality of system nodes of the distributed system comprise a plurality of database nodes in the distributed database system. The plurality of monitoring nodes may be distributed across two or more of a plurality of different locations each associated with at least one of the plurality of system nodes of the distributed system. In some embodiments, the plurality of system nodes of the distributed system are distributed across three or more geographically-distributed data centers, and each of the three or more geographically-distributed data centers is associated with at least one of the plurality of monitoring nodes. In other embodiments, the plurality of system nodes of the distributed system are distributed across three or more geographically-distributed data centers, and at least two of the three or more geographically-distributed data centers is associated with at least one of the plurality of monitoring nodes and at least one of the three or more geographically-distributed data centers is not associated with at least one of the plurality of monitoring nodes.

Monitoring operation of said at least one of the plurality of monitoring nodes having the primary monitoring role may comprise monitoring for heartbeat messages sent from said at least one of the plurality of monitoring nodes having the primary monitoring role. The heartbeat messages may be sent from said at least one of the plurality of monitoring nodes having the primary monitoring role to the two or more other ones of the plurality of monitoring nodes having the secondary monitoring role at different frequencies based at least on part on the time-based ranking of the plurality of monitoring nodes.

The FIG. 2 process may further comprise generating the time-based ranking of the plurality of monitoring nodes. The time-based ranking of the plurality of monitoring nodes in the monitoring system may be generated based at least in part utilizing a machine-learning based classifier that clusters the plurality of system nodes by their associated time-varying amounts of processing load. The machine learning-based classifier may further cluster the plurality of system nodes based at least in part on criticality of processing load at the plurality of system nodes of the distributed system. The machine learning-based classifier may comprise a k-nearest neighbor (KNN) dynamic time-based classifier.

In some embodiments, step 202 is performed responsive to detecting a failure of the first one of the plurality of monitoring nodes having the primary monitoring role at the given time. Detecting failure of the first one of the plurality of monitoring nodes may be based at least in part on the second one of the plurality of monitoring nodes not receiving at least a designated threshold number of heartbeat messages from the first one of the plurality of monitoring nodes. The designated threshold number may be different for each of the plurality of monitoring nodes and may be based at least in part on the time-based ranking of the plurality of monitoring nodes. In other embodiments, step 202 is performed responsive to detecting that the first one of the plurality of monitoring nodes having the primary monitoring role at the given time has a lower ranking in the time-based ranking of the plurality of monitors for the given time than the second one of the plurality of monitoring nodes.

With the continued growth of data (e.g., the arrival of the large data age), distributed databases are becoming important tools for storing data. A distributed database is a database set (e.g., of multiple database nodes implementing database instances) that is stored on many computers, but appears to applications as a single database. In a distributed database system, an application can access and modify data simultaneously in several databases in a network. In the distributed database, when one of the databases (e.g., database nodes or database set, also referred to as a cluster) is down, other databases will take over (e.g., in an active-active distributed database configuration).

As the importance of distributed databases continues to increase, the monitoring of such distributed databases also increases in importance. Database administrators (DBAs) need to view and monitor multiple different clusters or database nodes of the distributed database. Database implementations may use an active-active configuration, in which one database in the distributed database system is the primary and other databases in the distributed database system are backups. When the primary database is failing to serve for any reason, one of the backup databases will take over the "primary" role until the primary database comes back online.

Monitoring one primary database and one backup database is relatively simple, in that the database monitor knows that if the primary database is down, there is only one backup database available and the backup database will take over the primary role. When there are more than two databases in a distributed database system, however, monitoring is a more complex task as when the primary database is down there are two or more backup databases that can take over the primary role. The database monitor, however, will not know which of the two or more backup databases should take over the primary role. As one approach, the database monitor may be manually or statically programmed or configured to pick one of the two or more backup databases that will take over the primary role when the primary database is down. Such an approach, however, is not optimal for various scenarios (e.g., when a particular database or associated data center needs to be failed over due to network latency, planned maintenance, system unresponsiveness due to overload conditions, etc.). There is thus a need for approaches which enable database monitors to intelligently act and select the database that should take on the primary role in a distributed database system based on the current situation. Illustrative embodiments provide such approaches, and advantageously enable continuous monitoring of distributed database systems with intelligent topology-aware monitoring placement. Some embodiments do so utilizing artificial intelligence (AI)-based selection, providing better performance and zero down time (ZDT).

Figure 3:
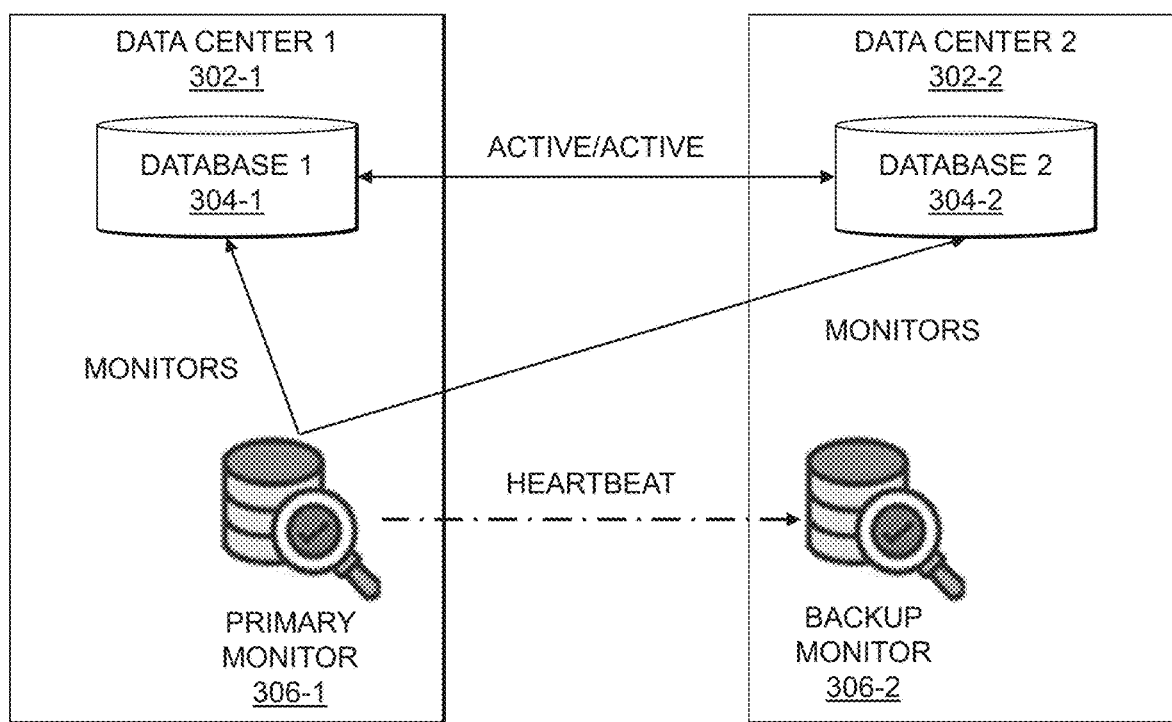
FIG. 3 shows a monitoring system comprising monitors deployed at two data centers hosting a distributed database system in an illustrative embodiment.

Various modern databases support a distributed architecture with high availability, and such databases come with or utilize a database monitoring system. The database monitoring system may comprise a primary monitoring module (also referred to herein as a primary monitor) and a secondary or backup monitoring module (also referred to herein as a secondary or backup monitor). The primary monitor will monitor the primary database of a distributed database system, and send "heartbeat" messages to the backup monitor (e.g., at regular intervals). FIG. 3 illustrates such a distributed database system monitoring architecture, where there are two data centers 302-1 and 302-2 (collectively, data centers 302) which implement respective databases 304-1 and 304-2 (collectively, databases 304) of a distributed database system. In the FIG. 3 example, the data center 302-1 implements the primary monitor 306-1 and the data center 302-2 implements the backup monitor 306-2. The primary monitor 306-1 monitors the databases 304 of the distributed database system, and sends heartbeat messages to the backup monitor 306-2.

In the case of failure of the data center 302-1, the distributed database system is not impacted due to its active-active configuration. The distributed database will go and find failover based on the implementation (e.g., a quorum algorithm). In the FIG. 3 example, the primary monitor 306-1 (implemented within the data center 302-1) will go down when the data center 302-1 fails, such that no heartbeat message will be sent to the backup monitor 306-2 at its regular interval. When the backup monitor 306-2 does not receive a heartbeat message at the regular interval (e.g., in 60 seconds or some other configurable time interval), the backup monitor 306-2 will assume the primary role.

Figure 4:
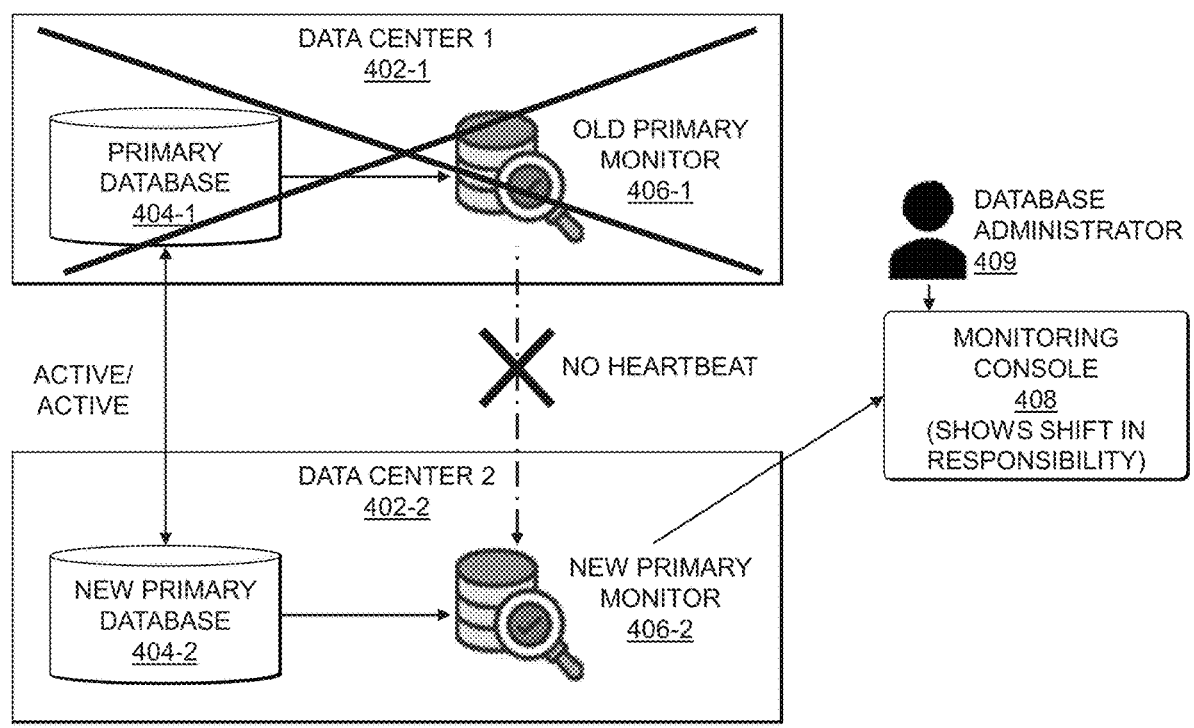
FIG. 4 shows a shift in primary monitoring responsibility in response to disruption of heartbeat messages between monitors of a monitoring system in an illustrative embodiment.

Such a scenario is illustrated in FIG. 4, which shows data centers 402-1 and 402-2 (collectively, data centers 402) comprising respective databases 404-1 and 404-2 (collectively, databases 404) of a distributed database system and respective monitoring modules 406-1 and 406-2 (collectively, monitors 406). FIG. 4 also illustrates a monitoring console 408 that is accessed by one or more DBAs 409. In the FIG. 4 example, it is assumed that the data center 402-1 fails, and that the data center 402-1 hosted the primary database 404-1 and the "old" primary monitor 406-1. When the old primary monitor 406-1 fails to provide a heartbeat message to the monitor 406-2 in the data center 402-2, the monitor 406-2 takes over as the "new" primary monitor 406-2 and the database 404-2 is the new primary database 404-2. This shift in responsibility between the monitors 406 and databases 404 is shown (e.g., displayed, notified, etc.) via the monitoring console 408 accessed by the DBAs 409. In the scenario of FIG. 4, however, disruption occurs when the data center 402-1 (and thus the old primary monitor 406-1) comes back online. When this happens, the old primary monitor 406-1 will try to again achieve the primary role, which will disrupt the distributed database system monitoring and require heavy manual intervention (e.g., by the DBAs 409) to remove the old system and re-configure.

Figure 5:
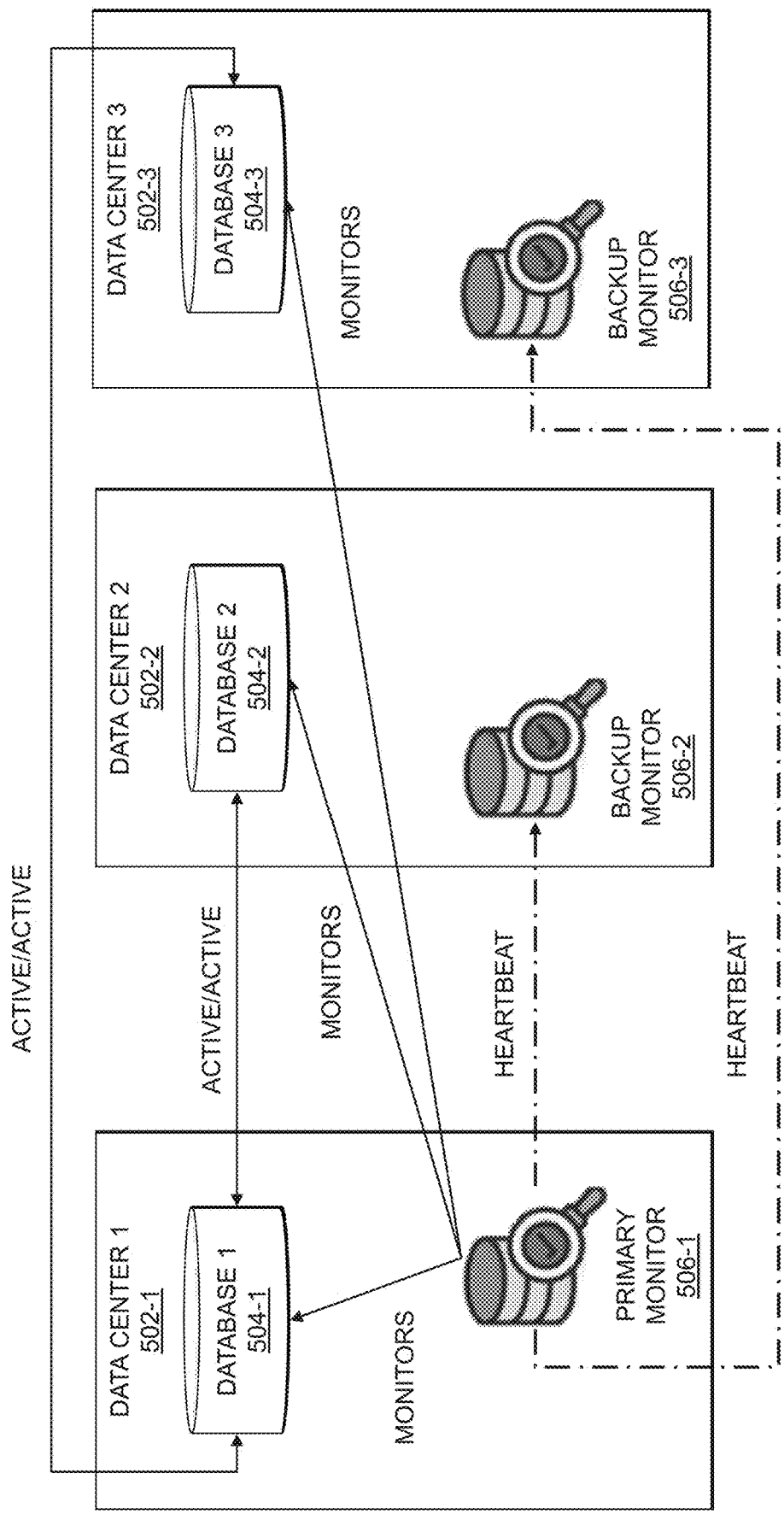
FIG. 5 shows a monitoring system comprising monitors deployed at three data centers hosting a distributed database system in an illustrative embodiment.

Some distributed database systems also have more than two data centers (e.g., with more than two databases and/or more than two database monitors). FIG. 5 illustrates such a distributed database system spread across three data centers 502-1, 502-2 and 502-3 (collectively, data centers 502) each comprising a database 504-1, 504-2 and 504-3 (collectively, databases 504) and a database monitor 506-1, 506-2 and 506-3 (collectively, database monitors 506). Here, the database monitor 506-1 is the primary monitor for the distributed database system, and database monitors 506-2 and 506-3 are backup monitors for the distributed database system. The databases 504 are in an active/active configuration, and the primary monitor 506-1 sends heartbeat messages to the backup monitors 506-2 and 506-3. When the primary monitor 506-1 goes down, both of the backup monitors 506-2 and 506-3 will not get the heartbeat message at the regular interval (e.g., 60 seconds or some other configurable interval) and will try to take over the primary role after not receiving the heartbeat message. This will lead the backup monitors 506-2 and 506-3 to enter a race condition, which requires heavy manual DBA intervention and can impact running applications (e.g., on host devices accessing the distributed database system) and the data stored in the distributed database system.

Consider the following scenario where there are three data centers A, B and C with corresponding database monitors a, b and c. Assume that the initial configuration is that "a" is the primary monitor and "b" is the backup monitor, with heartbeat messages being sent from "a" to "b." Here, "c" exists but is not configured as a backup to avoid the race condition noted above. If A goes down, a will also go down and b will not get the heartbeat at its regular interval (e.g., 60 seconds or some other configurable interval) B and b then become primary, and a DBA will manually configure "c" as the new backup monitor. The monitor b will then begin sending heartbeat messages to c. When the primary A comes back, it cannot be attached to the existing monitoring system, as there is already a 1-to-1 mapping between b and c. Further, if both the primary and backup monitors go down, until there is a manual reconfiguration all of the databases of the distributed database system will go unmonitored. This presents unacceptable risk for the distributed database system. Additionally, there is no intelligent way to handle different types of failure or other disruption scenarios involving different database monitors of a monitoring system for a distributed database system.

Figure 6:
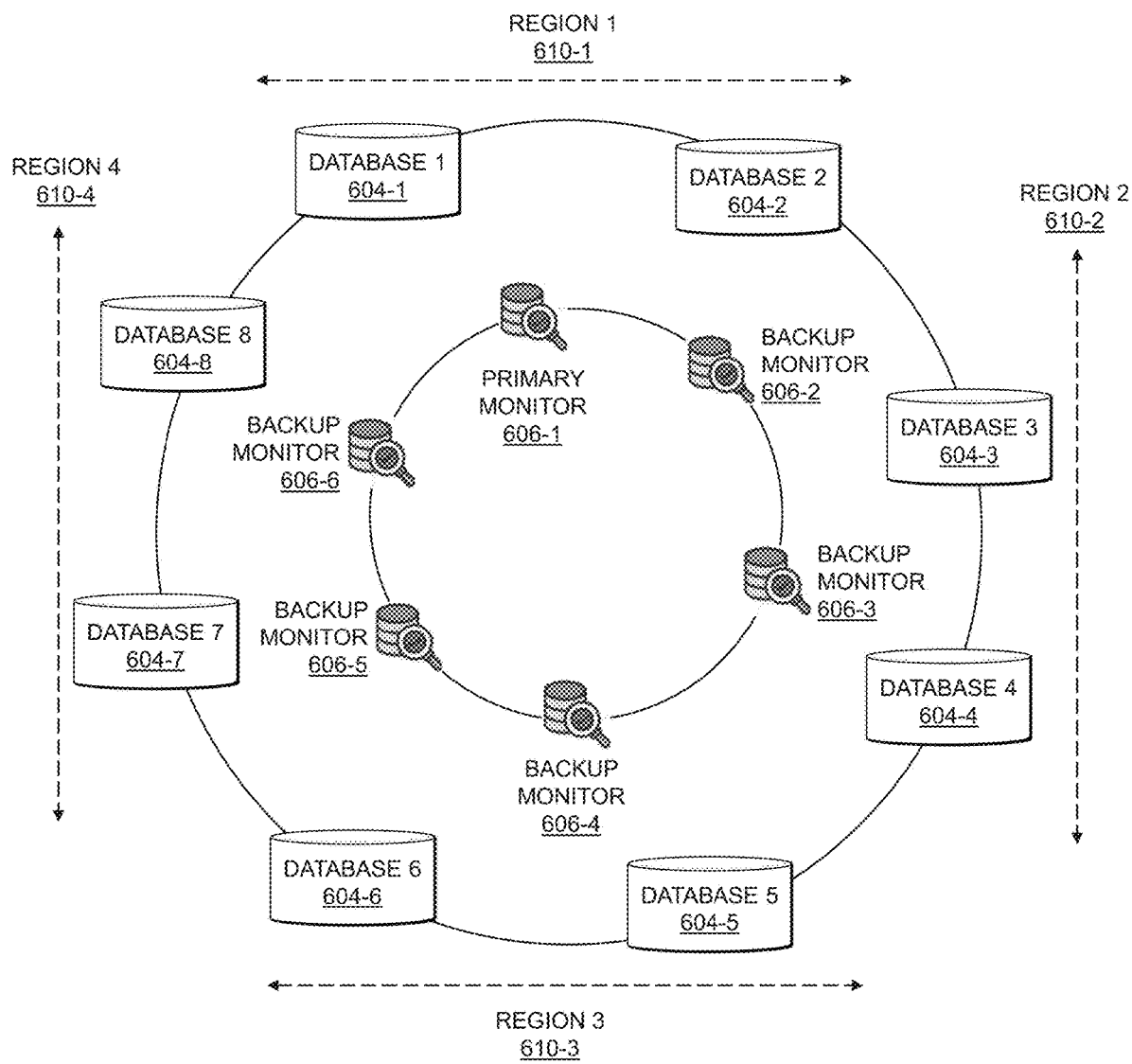
FIG. 6 shows a monitoring system comprising a primary and multiple backup monitors hosted in different regions having database nodes of a distributed database system in an illustrative embodiment.

Such issues are exacerbated with more complex distributed database systems, where there are multiple databases of the distributed database system across the world and also multiple database monitor instances for the database monitoring system. Consider the architecture of FIG. 6, which includes a set of databases 604-1 through 604-8 (collectively, databases 604) and database monitors 606-1 through 606-6 (collectively, database monitors 606) distributed across a set of regions 610-1 through 610-4 (collectively, regions 610). In the FIG. 6 example, the databases 604-1 and 604-2 as well as primary monitor 606-1 are in region 610-1 (e.g., a Western United States region), the databases 604-3 and 604-4 as well as backup monitors 606-2 and 606-3 are in region 610-2 (e.g., an Eastern United States region), the databases 604-5 and 604-6 as well as backup monitor 606-4 are in region 610-3 (e.g., a Europe, the Middle East and Africa (EMEA) region), and the databases 604-7 and 604-8 as well as backup monitors 606-5 and 606-6 are in region 610-4 (e.g., an Asia-Pacific region) It should again be noted that that the monitoring system for a distributed database system does not necessarily include the same number of database instances and database monitors (e.g., there may be fewer monitors than database instances, or more monitors than database instances). As illustrated in FIG. 6, for example, there are four database nodes or instances 604-1 through 604-4 in regions 610-1 and 610-2, but only three monitors 606-1, 606-2 and 606-3 altogether in the regions 610-1 and 610-2. Similarly, there are two database nodes or instances 604-5 and 604-6 in regions 610-3, but only one backup monitor 606-4 in the region 610-3.

In the FIG. 6 scenario, the primary monitor 606-1 will perform monitoring for all databases instances 604, and the backup monitors 606-2 through 606-6 will act as backups. If the primary monitor 606-1 goes down, however, it is difficult to determine which of the backup monitors should take on the primary role. The transactional load in the distributed database system may vary across the database nodes or instances 604 over time. For example, in the morning time in region 610-1 (e.g., Western United States), a higher amount of transactions may be generated in database instances 604-1 and 604-2, while in the morning time of region 610-3 (e.g., EMEA) a higher amount of transactions may be generated in database instances 604-5 and 604-6, and so on. If the primary monitor 606-1 remains in the region 610-1 at all times, the latency of the majority of transactions in the distributed database system may be significantly higher at some times (e.g., the peak times for regions 610-2 through 610-4). Further, there may be seasonality in transactional load. For example, database instances 604-1 through 604-4 in the regions 610-1 and 610-2 (e.g., Western and Eastern United States) may be higher during "Black Friday" shopping times. Thus, always keeping the primary monitor 606-1 in the same region 610-1 is not the most efficient way to implement the monitoring system for a distributed database system.

There are various qualities or factors for determining the optimal or best database monitor of a set of database monitors that should take on the primary role of monitoring a distributed database system at any particular point in time. Such factors include, but are not limited to: avoiding race conditions or complexity for enabling backups to take on the primary role in the event that the primary monitor goes down, having the primary monitor in the lowest latency zone or region; having the primary monitor in the zone or region that has the highest amount and/or most critical transactions happening at a given time; the primary monitor should be switched as transactional load varies across different regions to maintain the lowest latency between high and critical transaction load in the distributed database system and the location of the primary monitor, when the primary monitor is down, the primary role should switch to the next best available monitor where it keeps the latency to the high or critical transaction load zones lowest; and when an "old" primary monitor comes back online, if the old primary monitor would give the lowest latency then it should switch back to the primary role, otherwise it can re-join the monitoring system as a backup monitor.

Conventional monitoring systems for distributed database systems have restrictions in that such conventional monitoring systems do not ingest an active replication across primary and backup monitors to implement algorithms for achieving reliability in a network involving multiple potentially unreliable nodes. Further, conventional monitoring systems for existing distributed database systems are not topology-aware. Illustrative embodiments solve these and other disadvantages with such conventional monitoring systems for distributed database systems, and can support infrastructure monitoring across any number of data centers or other locations where databases of a distributed data system are located. To do so, some embodiments implement an intelligent, cluster-aware and topology-aware registry of monitors which enables variable targeted heartbeat duration across backup monitors (e.g., to avoid race conditions). The registry of monitors may be built utilizing machine learning algorithms to determine the appropriate variable targeted heartbeat duration. Further, some embodiments provide for automatic and accurate detection of new primary monitors based on the machine learning, and implement changes over the monitoring topology to enable continuous monitoring during failover.

Advantageously, the monitoring systems described herein enable intelligent decision-making in various scenarios. For example, intelligent decision-making on failover allows for planned maintenance which does not require failover to a different data center. Additionally, the monitoring systems described herein can support zero impact horizontal scalability during new data center expansion. Further, the decision to have a new monitor take on the primary role can be based on inbuilt statistical analysis on network latency, fault tolerance, location (e.g., applying affinity rules), availability, and other characteristics. Advantageous, the monitoring systems described herein can be applied to monitor any distributed database system as well as other types of distributed systems (e.g., distributed computing or processing systems having multiple nodes distributed across different locations).

As discussed above, conventional database monitoring systems may only support one primary monitor and one backup monitor. In such a configuration, the backup monitor listens for heartbeat messages from the primary monitor to determine whether the primary monitor is up and running. If the backup monitor does not detect a heartbeat message from the primary monitor within some configurable time interval (e.g., which may be 60 seconds by default), the backup monitor initiates a failover process and automatically assumes the responsibilities of the primary monitor.

In a multi-node monitoring scenario (e.g., with three or more database monitors), there is a need for a solution that will identify the next "best" monitor from among the available backup monitors if the primary monitor is down. Further, there is a need for a solution that can handle when an "old" primary monitor comes back (e.g., to prevent the old primary monitor from automatically becoming or attempting to take on the primary monitoring role which can disrupt operation). Further, there is a need for a solution which can dynamically change the location of the primary monitor. Conventional approaches where the location of the primary monitor is static suffer from various disadvantages, including high latency between the primary monitor and the database nodes currently experiencing high transaction load, due to changes in transaction load over time. Such changes in the transaction load may be the result of different peak operating times in a globally distributed database system (e.g., with database nodes in the United States, EMEA, Asia-Pacific, etc.) at different times of the day, due to seasonality factors, etc.

As discussed above, with one primary monitor and multiple backup monitors (e.g., such as the scenario with the three database monitors across three data centers as illustrated in FIG. 5), there may be a race condition among the backup monitors to become the primary monitor as the heartbeat message from the existing primary monitor to all of the backup monitors is on the same fixed time interval. The solutions described herein provide for intelligent, topology-aware monitor placement and selection. Such selection is illustratively based on or takes into account more than simply whether a server or other host of a particular monitor is up or down. The selection may be based at least in part on server load and availability, disk space usage, memory consumption, network latency, performance, CPU utilization, etc. Further, the solutions described herein enable a hybrid monitoring system which can utilize both on-disk and in-memory capabilities to provide high-performance data processing. The solutions described herein also enable interoperation across boundaries (e.g., between cloud instances and on-premise architectures) with the same level of distribution and access flexibility being maintained for data. To do so, some embodiments utilize a software-defined approach that provides a common set of data services across any suitable combination of IT resources.

In some embodiments, the solution includes both a machine-learning based ranking of database monitors (e.g., via machine learning-based monitor ranking logic 170 described above) and an intelligent "role reversal" functionality that is attached to or built-in to each monitor (e.g., via topology-aware monitor role selection logic 160 described above). The machine-learning based ranking of database monitors enables selection of the next best or optimal "primary" monitor at any given time, based on various factors (e.g., distributed load characteristics, latency between high-loaded database nodes and the different monitors, etc.). The intelligent role reversal functionality at the current primary monitor will generate heartbeat messages for different backup monitors at varied times based on the current ranking of the backup monitors (e.g., where higher-ranked backup monitors will have a relatively higher frequency of heartbeat messages and lower-ranked backup monitors will have relatively lower frequency of heartbeat messages). The intelligent role reversal functionality at each backup monitor will listen for heartbeat messages from the primary monitor (e.g., in accordance with a time interval or frequency that is based at least in part on its current ranking among available backup monitors). In the case that a particular backup monitor misses a designated threshold number of expected heartbeat messages (e.g., where this designated threshold may be one), then that backup monitor will take over the primary role and begin sending heartbeat messages to other backup monitors. The role reversal functionality at each monitor (e.g., at the primary monitor and each backup monitor) is also configured, based on the ranking of monitors at a given time, to change the primary role from one monitor to another (e.g., that will have relatively lower latency at the given time) even if the current primary monitor is up.

Figure 7:
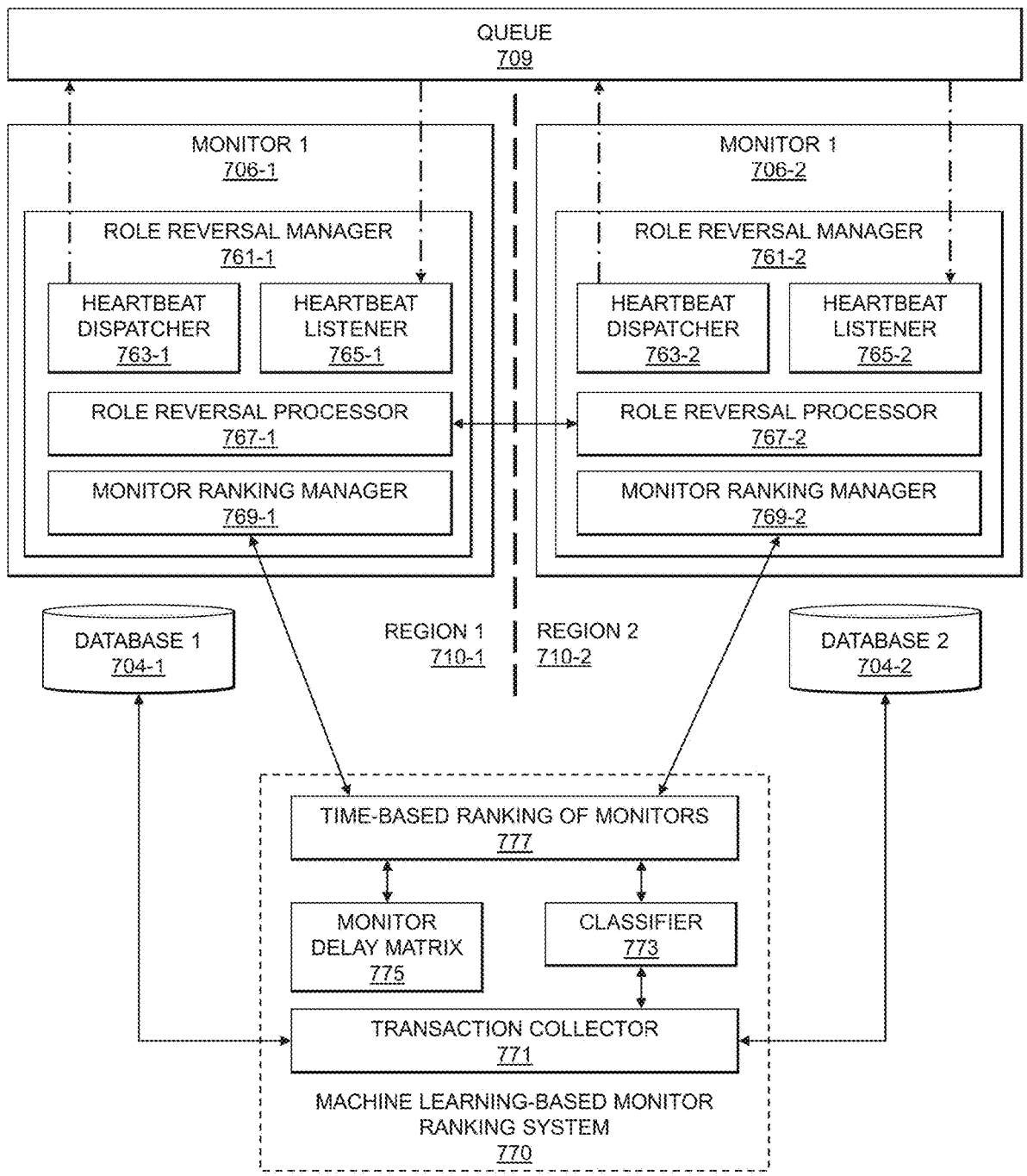
FIG. 7 shows an implementation of topology-aware ranking and role reversal of monitors of a monitoring system in an illustrative embodiment.

FIG. 7 shows an example implementation, where only two database instances 704-1 and 704-2 (collectively, databases 704) of a distributed database system and only two monitors 706-1 and 706-2 (collectively, monitors 706) are shown for clarity of illustration. It should be appreciated, however, that there may be more than two database instances and/or more than two monitors. Further, as discussed above, there is not necessarily a one-to-one correspondence between database instances and monitors—there may be more or fewer monitors than database instances. Here, a machine learning-based monitor ranking system 770 implements a transaction collector 771 which collects transactions from the databases 704. The transaction collector 771 is coupled to a classifier 773 (e.g., a KNN dynamic time classifier) that will classify the databases 704 based on variations in transactional load as determined from the collected transactions. A monitor delay matrix 775 of the machine learning-based monitor ranking system 770 characterizes latency between the monitors 706 and the databases 704. The output of the classifier 773 and the monitor delay matrix 775 are utilized to determine a time-based ranking of monitors 777 which is provided from the machine learning-based monitor ranking system 770 to the monitors 706.

The monitors 706-1 and 706-2 implement respective role reversal managers 761-1 and 761-2 (collectively, role reversal managers 761). The role reversal managers 761-1 and 761-2 implement respective heartbeat dispatchers 763-1 and 763-2 (collectively, heartbeat dispatchers 763), heartbeat listeners 765-1 and 765-2 (collectively, heartbeat listeners 765), role reversal processors 767-1 and 767-2 (collectively, role reversal processors 767), and monitor ranking managers 769-1 and 769-2 (collectively, monitor ranking managers 769). Here, the database 704-1 and monitor 706-1 are assumed to be in a first region 710-1, while the database 704-2 and monitor 706-2 are assumed to be in a second region 710-2. The heartbeat dispatchers 763 are configured to send heartbeat messages to a queue 709, while the heartbeat listeners 765 are configured to receive heartbeat messages from the queue 709. At any given time, one of the monitors (e.g., monitor 706-1) will be acting as the primary, and thus it will use its heartbeat dispatcher 763-1 to issue or send heartbeat messages to the queue 709, while other monitors (e.g., monitor 706-2) will be acting as backups and will use its heartbeat listener 765-2 to listen for heartbeat messages on the queue 709 at a set interval (e.g., which may be based on the ranking of that monitor 706-2 as described in further detail elsewhere herein). The role reversal processors 767 are configured to switch the roles of the monitors 706 (e.g., from primary to backup and vice-versa) based on the time-based ranking of monitors 777 provided to the monitor ranking managers 769. Such role reversal may occur when the current primary monitor goes down, to switch the location of the primary to achieve lower latency as transaction load across the databases 704 shifts, etc.

Figure 8:
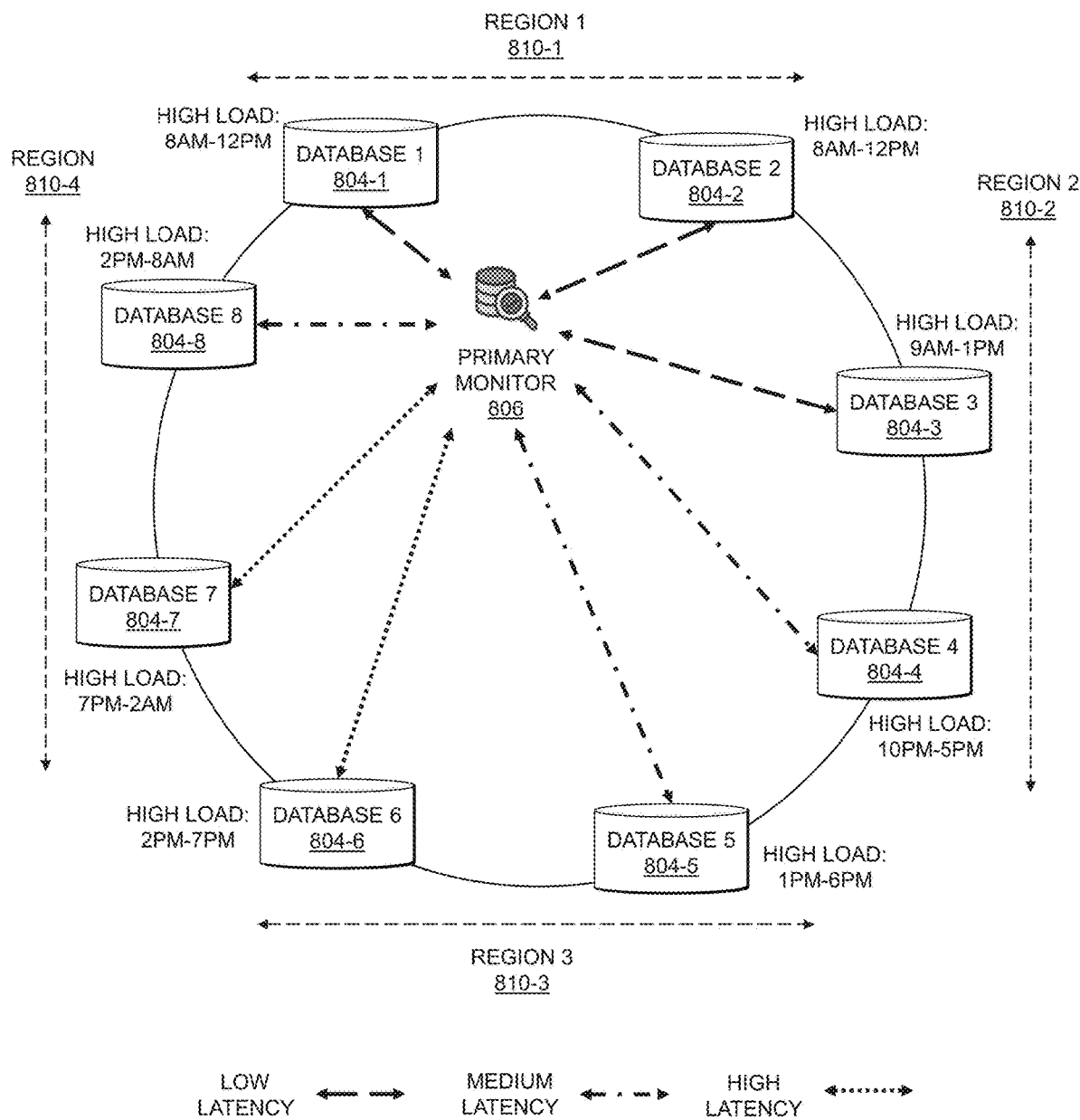
FIG. 8 shows latency between a primary monitor and multiple database nodes in different regions having different transactional load peak times in an illustrative embodiment.

FIG. 8 shows a simplified "N" node distributed architecture with database instances 804-1 through 804-8 separated across regions 810-1 through 810-4 in a manner similar to that described above with respect to database instances 604 and regions 610 shown in FIG. 6. For clarity of illustration, FIG. 8 shows only a single monitor—a current primary monitor 806. As shown in FIG. 8, the database instances 804 experience high load at different times of the day (e.g., 8 AM-12 PM for databases 804-1 and 804-2, 9 AM-1 PM for database 804-3, 10 PM-5 PM for database 804-4, 1 PM-6 PM for database 804-5, 2 PM-7 PM for database 804-6, 7 PM-2 AM for database 804-7, and 2 PM-8 AM for database 804-8). FIG. 8 also illustrates connections between the database instance 804 and primary monitor 806 with different lines corresponding to low, medium and high latency network connections. As can be seen from FIG. 8, between 2 PM and 2 AM, the region 810-3 will have the highest transaction load but the worst latency with the primary monitor 806 (assumed to be in region 810-1). Thus, if the primary monitor 806's location can be shifted (e.g., to a backup monitor) in region 810-3 during this time frame then the monitoring efficiency will increase.

Figure 9:
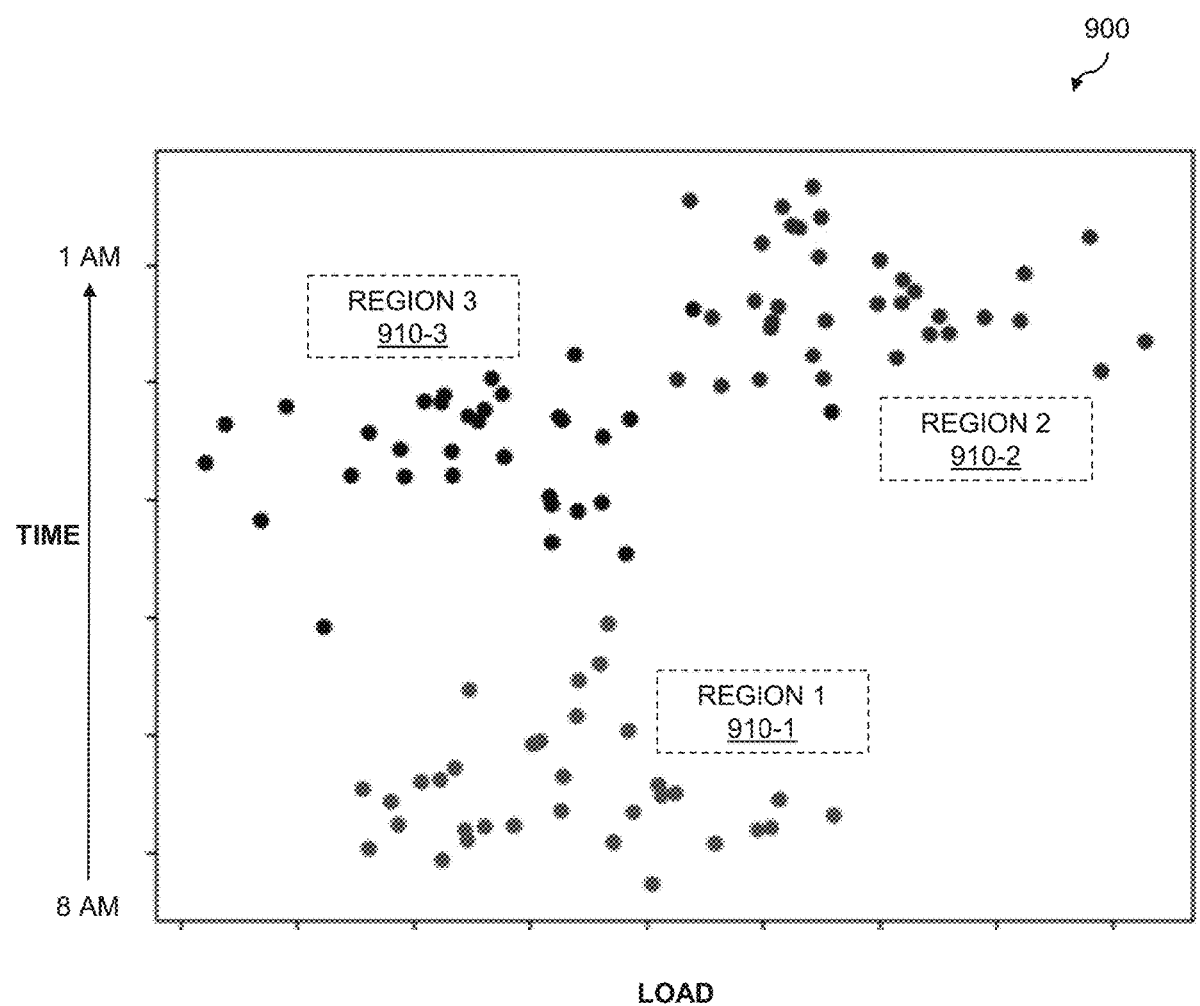
FIG. 9 shows a plot illustrating clustering of load in different regions at different times in an illustrative embodiment.
Figure 10:
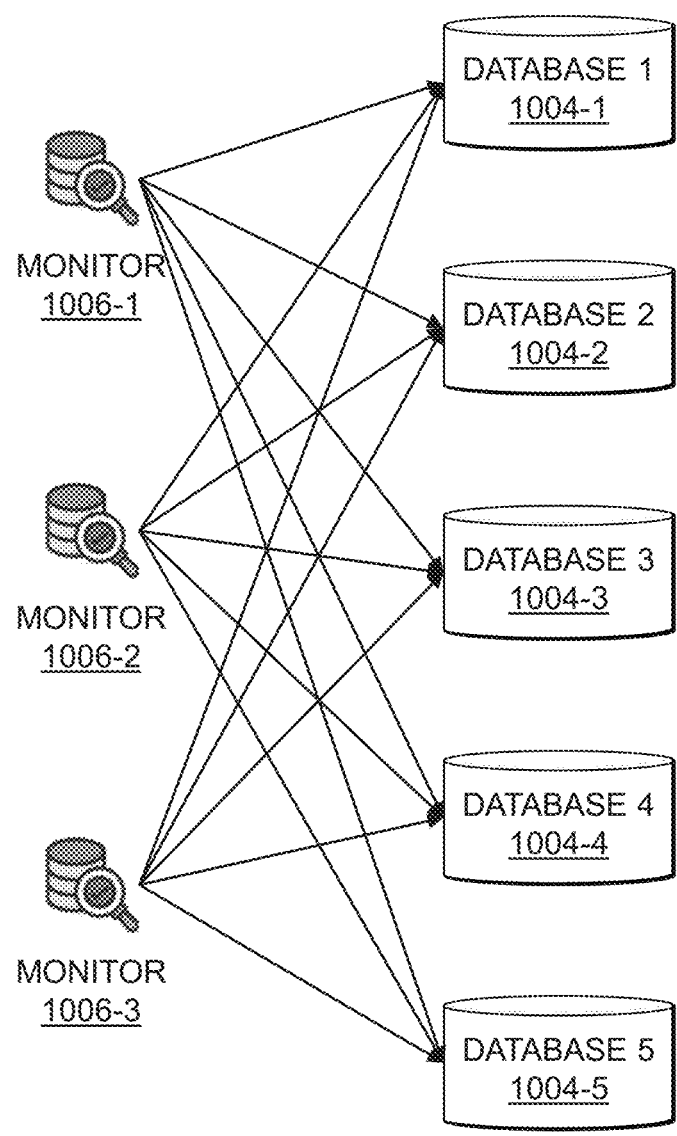
FIG. 10 shows monitoring of latency between a set of monitors and database nodes of a distributed database system in an illustrative embodiment.

Machine learning is advantageously utilized to find the load distribution across the nodes (e.g., database instances), to find out which monitor can provide the best service at different times. To do so, the transaction collector 771 of the machine learning-based monitor ranking system 770 will collect and determine the transaction distribution against load. This is illustrated by the plot 900 of FIG. 9, which shows load as a function of time with clusters for regions 910-1 (e.g., United States), 910-2 (Asia-Pacific) and 910-3 (e.g., EMEA). The load can then be classified based on time, as well as potentially other factors such as transaction criticality. Various time series machine learning classification algorithms may be used. In some embodiments, a KNN algorithm with dynamic time wrapping is utilized, resulting in the scatter plot 900 of FIG. 9.

The latency of each monitor to the different database instances may also be logged. Consider the example of FIG.

10, where there are three monitors 1006-1, 1006-2 and 1006-3 (collectively, monitors 1006) and five database nodes 1004-1, 1004-2, 1004-3, 1004-4 and 1004-5 (collectively, database nodes 1004). The latency between each of the monitors 1006 and each of the database nodes 1004 may be logged. With the results of the classification and latency metrics, the machine learning-based monitor ranking system 770 can produce the time-based ranking of monitors 777.

Figure 11:
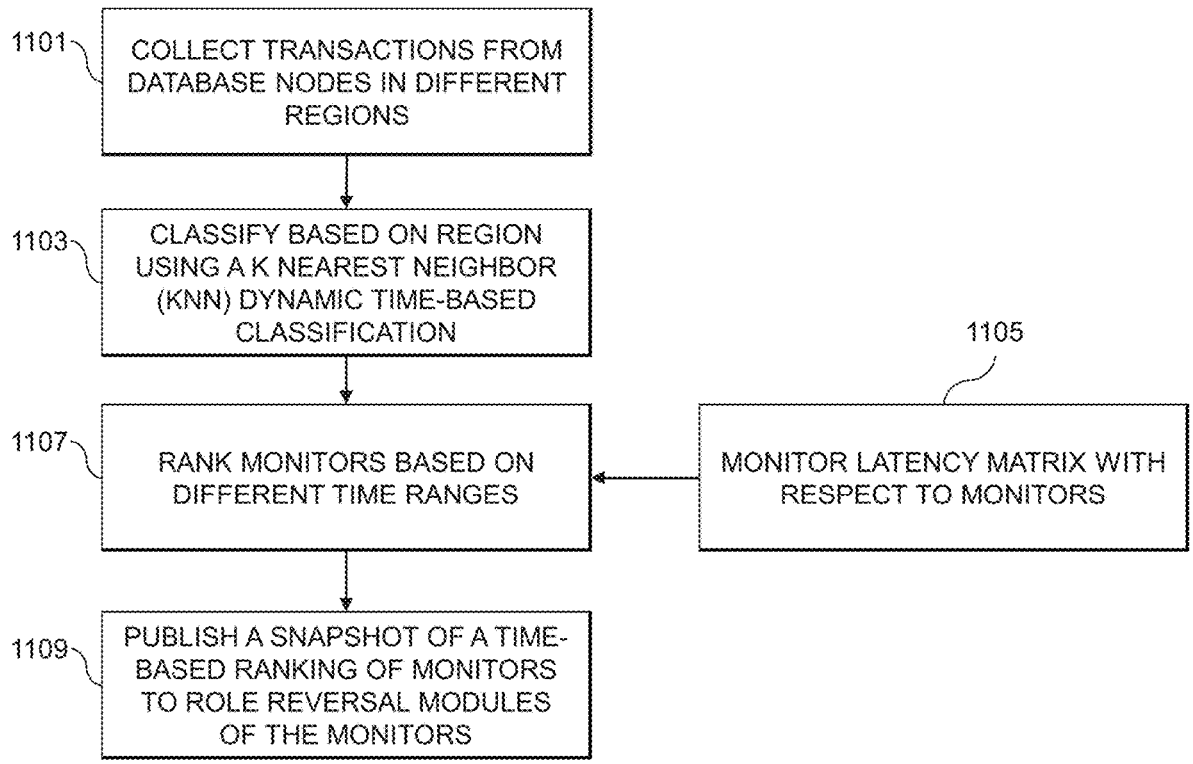
FIG. 11 shows a process flow for generating and publishing snapshots of time-based monitor rankings in an illustrative embodiment.

FIG. 11 illustrates the overall process flow for operation of the machine learning-based monitor ranking system 770. In step 1101, the transaction collector 771 collects transactions from the databases 704 in different regions 710. In step 1103, the classifier 773 classifies load based on region (e.g., using a KNN dynamic time-based classification). In step 1105, the latency between the monitors 706 and the databases 704 is monitored (e.g., to generate the monitor delay matrix 775). In step 1107, the time-based ranking of the monitors 777 is produced (e.g., based on the output of the classifier 773 in step 1103 and the output of the monitor delay matrix 775 in step 1105). A snapshot of the time-based ranking of monitors 777 is published to the role reversal managers 761 of the monitors 706 in step 1109, enabling the monitors 706 to make the appropriate selection of the primary monitor at any given time.

Figure 12:
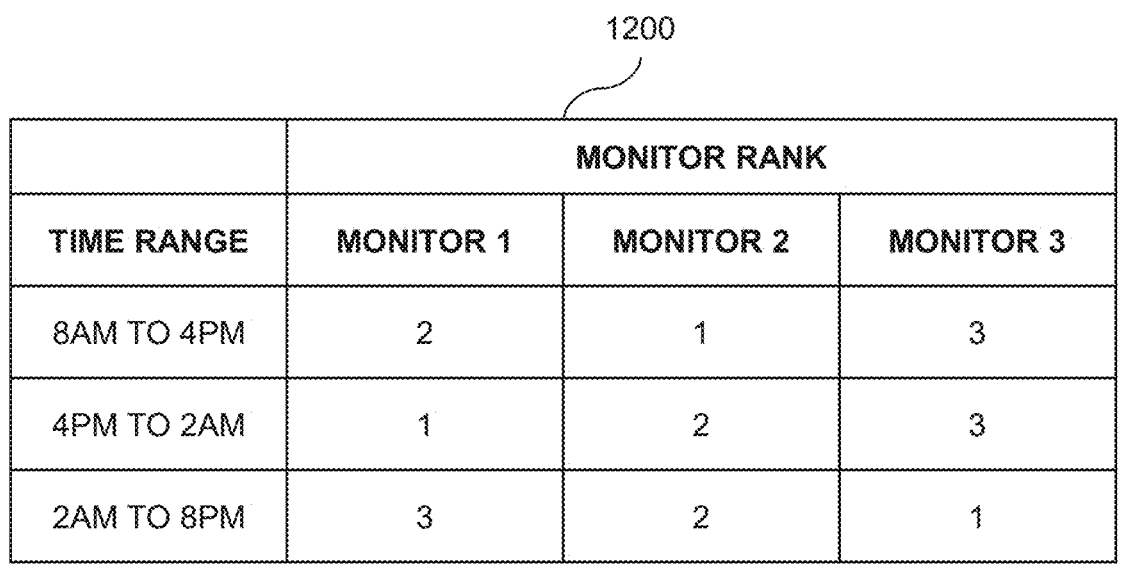
FIG. 12 shows an example of a time-based monitor ranking in an illustrative embodiment.

FIG. 12 shows a table 1200 illustrating an example time-based ranking of monitors. In this example, there are three monitors, whose rankings change across three different time ranges. It should be appreciated that there may be more or fewer than three monitors, and that a particular time-based ranking may have more or fewer than three time ranges. Further, it should be noted that the time-based ranking of monitors may be re-calculated at specific intervals, or in response to designated conditions (e.g., addition or removal of monitors from a monitoring system, addition or removal of databases from a distributed database system, etc.).

The monitor ranking managers 769 are configured to keep a latest snapshot of the machine learning suggested time-based ranking of monitors 777, which will tell the role reversal processors 767 what the best or optimal monitor is at any given time (as well as an ordering of the next-based or next-optimal monitors to which the "primary" role should be shifted in the event of failover). As noted above, if a particular monitor (e.g., monitor 706-1) is currently acting in the primary role, it will utilize its heartbeat dispatcher 763-1 to send heartbeat messages to other monitors acting in the backup role (e.g., monitor 706-2) via queue 709. The frequency at which heartbeat messages are dispatched to different backup monitors is based on the current time-based ranking of monitors 777 (e.g., the higher the rank, the higher the frequency that heartbeat messages are sent). In the example of FIG. 12, between 8 AM and 4 PM the monitor 2 (M2) will be the "primary" with the monitor 1 (M1) having the next rank and the monitor 3 (M3) being ranked last. Thus, the frequency at which M2 will send heartbeat messages to M1 (e.g., every 20 seconds) is greater than the frequency at which M2 will send heartbeat messages to M3 (e.g., every 30 seconds). Such heartbeat messages are sent to the queue 709, to which each monitor 706 is connected. For ones of the monitors 706 acting as backup monitors (e.g., 706-2), their associated heartbeat listeners (e.g., 765-2) will listen to the queue 709 for heartbeat messages from the primary monitor (e.g., 706-1). If a particular backup monitor 706-2 does not receive a designated threshold number of heartbeat messages at its specified interval (e.g., where the designated threshold may be one), it will notify or trigger its associated role reversal processor 767-2.

It should be appreciated that in some embodiments, it is not necessary for heartbeat messages to be sent to different monitors at different frequencies. Consider, for example, a scenario in which heartbeat messages are sent at the same frequency (e.g., every X seconds) to each backup monitor. The backup monitors may be configured with different designated heartbeat threshold numbers based on their ranking in the time-based ranking of monitors 777, where the designated heartbeat threshold number for the highest-ranked backup monitor is less than the designated heartbeat threshold number for the next highest-ranked backup monitor, and so on. Consider, for example, where the heartbeat message frequency for each backup monitor is 30 seconds, but where the highest ranked backup monitor has a designated heartbeat threshold number of 1 and the next highest ranked backup monitor has a designated heartbeat threshold number of 2. This means that if the highest ranked backup monitor misses just a single heartbeat message, it will trigger role reversal with the primary monitor, but the next highest ranked backup monitor must miss two heartbeat messages before triggering role reversal with the primary monitor. This provides an alternate mechanism for avoiding the race condition described elsewhere herein.

Role reversal can happen in response to different scenarios, including what is referred to herein as machine learning or ML-based role reversal and on-demand role reversal. ML-based role reversal is performed based on transaction load distribution which suggests an optimal one of the monitors 706 to act as the primary at any given time. On-demand role reversal is performed when the current primary monitor goes down, in which case the highest-ranked backup monitor that is still up will take over the primary role. For ML-based role reversal, if a particular one of the monitors 706 that has a highest ranking for a current time is not currently assigned the primary role, it can initiate the role reversal process to take over the primary role. Consider again the example of FIG. 12, in the time range of 4 PM to 2 AM, where M1 is the highest-ranked monitor. At 4 PM, M1 will initiate the role reversal process to take over the primary role from M2 (which was assumed to be the primary in the previous time range of 8 AM to 4 PM, since M2 had the highest ranking for that time range). Following the role reversal process, M2 becomes a backup and M1 becomes the primary.

For on-demand role reversal, if a backup monitor does not get the designated threshold number of heartbeat messages, it will seek to take over the primary role from the monitor with the first or highest ranking at the given time. Since the heartbeat messages are sent on a delay which is based on the ranking, the second-best or second-optimal backup monitor (e.g., with the second rank at the given time) would be the first one to seek to take over the primary role (e.g., unless the second-ranked monitor is also down, in which case the third-ranked monitor would seek to take over the primary role assuming the third-ranked monitor is up, and so on). Before seeking to take over the primary role, the backup monitor may ping the current primary monitor to check if it is live or not. Consider again the example of FIG. 12, where M1 is primary between 4 PM and 2 AM, with M2 being the next-highest ranked monitor in that time range and M3 being the lowest ranked monitor in that time range. M2 would thus get heartbeat messages more frequently than M3 (or alternatively, M2 would need to miss a fewer number of heartbeat messages than M3 before triggering role reversal as discussed above). Thus, M2 would be the first to know that a heartbeat connection with M1 is disrupted. Before triggering role reversal, M2 may ping M1 to see if M1 is live or not. If the ping is unsuccessful (e.g., the ping times out, indicating the M1 is not live), then M2 will broadcast to other backup monitors (e.g., M3) that M2 will take over the primary role. With this process, M3 will not try to become the primary when it detects disruption of a heartbeat connection with M1. As M2 takes over the primary role, it will start dispatching heartbeat messages to other backups (e.g., M3). When M1 comes back online, it will claim the primary role back from M2 using the ML-based role reversal, if appropriate (e.g., if M1 comes back online while it is still the highest-ranked monitor).

Illustrative embodiments advantageously enable topology-aware monitor placement and selection, providing a novel way of switching the role of the primary monitoring job among monitors of a distributed monitoring system based on the delay telemetry (e.g., latency) between the monitors and the system being monitored (e.g., databases of a distributed database system). Machine learning may be utilized to rank the monitors in the topology, with such rankings being utilized to handle switchover when the monitor currently acting in the primary role fails. Further, dynamic re-positioning of primary and backup monitors of a distributed monitoring system (e.g., across different geographic regions or other locations) is enabled according to traffic and optimal delay time in the high traffic area throughout the day (e.g., when there is more traffic in a given region than other regions, the primary monitoring job may shift to a monitor that is in or close to the given region), based on trend or seasonality factors, etc.

Intelligent selection of monitors is enabled through the use of machine learning (e.g., a KNN algorithm with dynamic mapping) that classifies the load distribution across different regions in different time ranges (e.g., throughout the day, on different days of the week, combinations thereof, etc.) to predict the next best primary monitor according to the load distribution of the system being monitored. Further, the solutions described herein enable a hybrid monitoring approach. Applications and databases, for example, may have a distributed architecture with failover functionality. The monitoring for such applications and databases (or other system being monitored) are lacking in this space (e.g., as monitoring may be thought of last or with lower priority). The solutions described herein, however, enable simplified maintenance, as the monitoring system may have zero or reduced downtime.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for controlling monitoring roles of monitoring nodes in a monitoring system based at least in part on a time-based ranking of the monitoring nodes will now be described in greater detail with reference to FIGS. 13 and 14. Although described in the context of system 100, these platforms may also be used to implement at least portions of other information processing systems in other embodiments.

Figure 13:
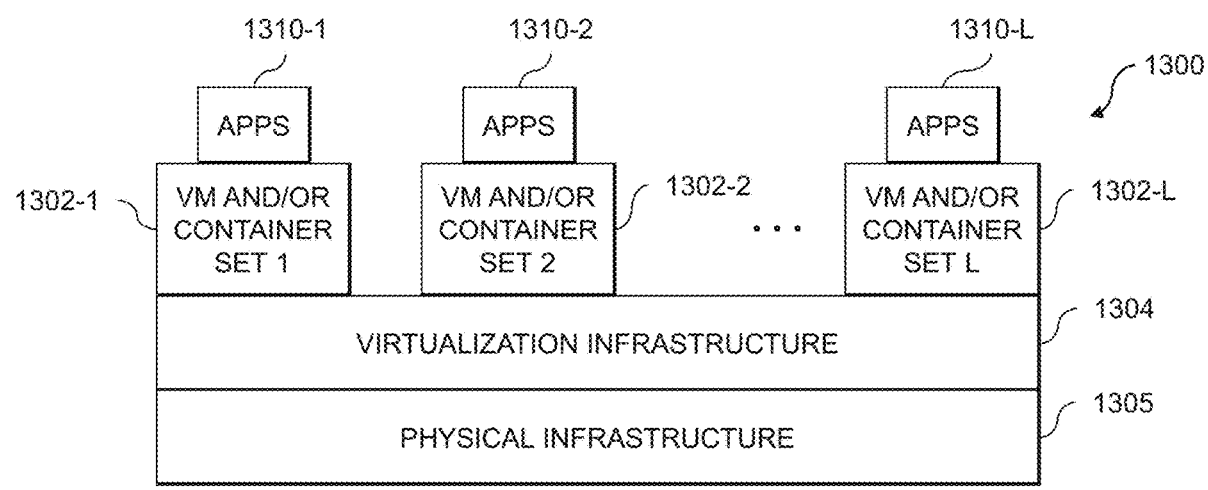
FIGS. 13 and 14 show examples of processing platforms that may be utilized to implement at least a portion of an information processing system in illustrative embodiments.
Figure 14:
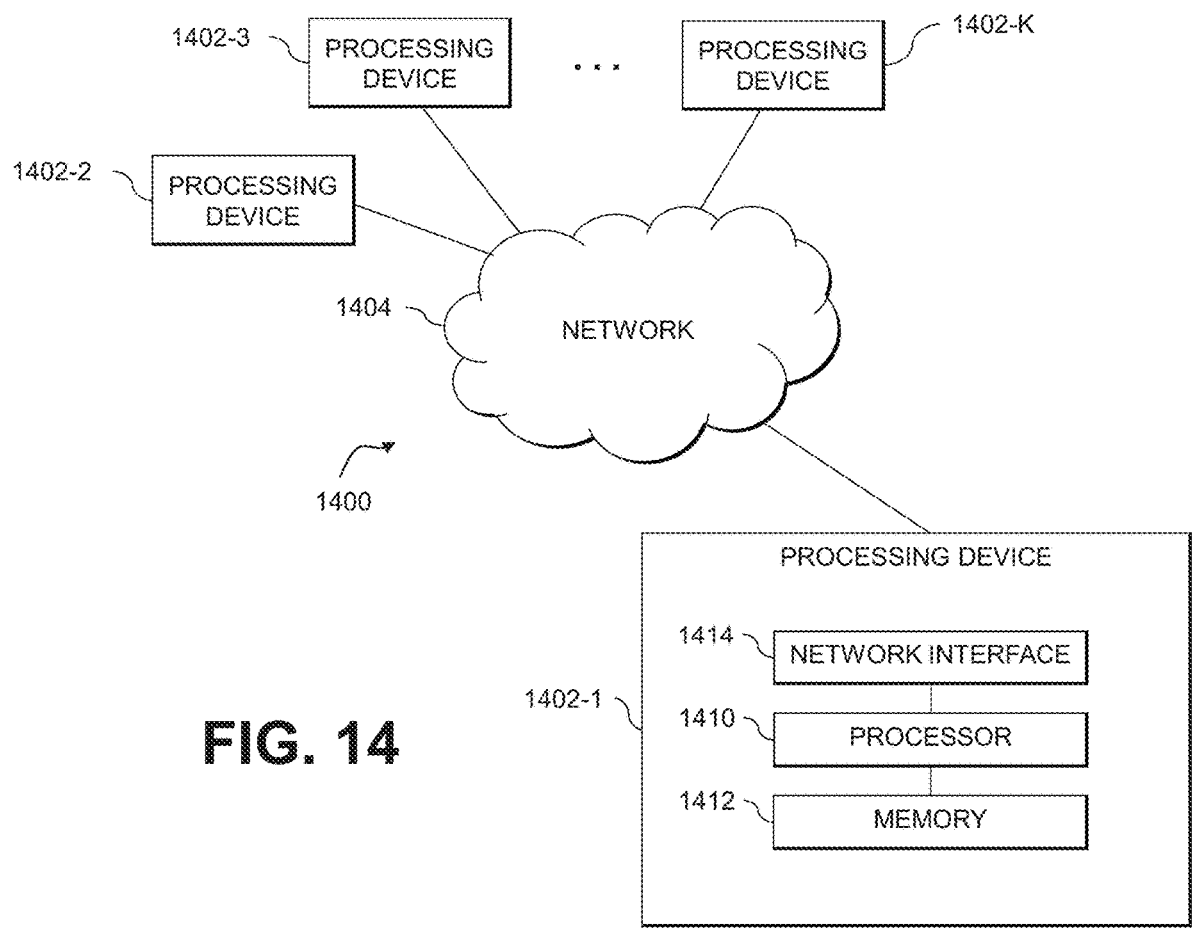

FIG. 13 shows an example processing platform comprising cloud infrastructure 1300. The cloud infrastructure 1300 comprises a combination of physical and virtual processing resources that may be utilized to implement at least a portion of the information processing system 100 in FIG. 1. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. A hypervisor platform may be used to implement a hypervisor within the virtualization infrastructure 1304, where the hypervisor platform has an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for controlling monitoring roles of monitoring nodes in a monitoring system based at least in part on a time-based ranking of the monitoring nodes as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, databases, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
in a monitoring system comprising a plurality of monitoring nodes in which at any given time at least one of the plurality of monitoring nodes has a primary monitoring role responsible for monitoring operation of a plurality of system nodes of a distributed system and two or more other ones of the plurality of monitoring nodes have a secondary monitoring role responsible for monitoring operation of said at least one of the plurality of monitoring nodes having the primary monitoring role, identifying at least a first one of the plurality of monitoring nodes having the primary monitoring role at a current time;
determining, based at least in part on a time-based ranking of the plurality of monitoring nodes, a second one of the plurality of monitoring nodes having the secondary monitoring role in the monitoring system at the current time to transition to the primary monitoring role, the time-based ranking of the plurality of monitoring nodes comprising rankings of the plurality of monitoring nodes for each of two or more different time ranges, the rankings being based at least in part on (i) processing load of the plurality of system nodes in each of the two or more different time ranges and (ii) latency between respective ones of the plurality of monitoring nodes and respective ones of the plurality of system nodes; and
transitioning the second one of the plurality of monitoring nodes to the primary monitoring role at a subsequent time;
wherein determining the second one of the plurality of monitoring nodes to transition to the primary monitoring role at the subsequent time comprises selecting the second one of the plurality of monitoring nodes to reduce a predicted latency between the second one of the plurality of monitoring nodes and a first subset of the plurality of system nodes at the subsequent time, the first subset of the plurality of system nodes having a first predicted processing load at the subsequent time that is different than a second predicted processing load of a second subset of the plurality of system nodes at the subsequent time.

2. The apparatus of claim 1 wherein the distributed system comprises a distributed database system, and wherein the plurality of system nodes of the distributed system comprise a plurality of database nodes in the distributed database system.

3. The apparatus of claim 1 wherein the plurality of monitoring nodes are distributed across two or more of a plurality of different locations each associated with at least one of the plurality of system nodes of the distributed system.

4. The apparatus of claim 1 wherein the plurality of system nodes of the distributed system are distributed across three or more geographically-distributed data centers, and wherein each of the three or more geographically-distributed data centers is associated with at least one of the plurality of monitoring nodes.

5. The apparatus of claim 1 wherein the plurality of system nodes of the distributed system are distributed across three or more geographically-distributed data centers, and wherein at least two of the three or more geographically-distributed data centers is associated with at least one of the plurality of monitoring nodes and at least one of the three or more geographically-distributed data centers is not associated with at least one of the plurality of monitoring nodes.

6. The apparatus of claim 1 wherein monitoring operation of said at least one of the plurality of monitoring nodes having the primary monitoring role comprises monitoring for heartbeat messages sent from said at least one of the plurality of monitoring nodes having the primary monitoring role.

7. The apparatus of claim 6 wherein the heartbeat messages are sent from said at least one of the plurality of monitoring nodes having the primary monitoring role to the two or more other ones of the plurality of monitoring nodes having the secondary monitoring role at different frequencies based at least on part on the time-based ranking of the plurality of monitoring nodes.

8. The apparatus of claim 1 wherein the at least one processing device is further configured to perform the step of generating the time-based ranking of the plurality of monitoring nodes.

9. The apparatus of claim 1 wherein the time-based ranking of the plurality of monitoring nodes in the monitoring system is generated based at least in part utilizing a machine-learning based classifier that clusters the plurality of system nodes by their associated time-varying amounts of processing load.

10. The apparatus of claim 9 wherein the machine learning-based classifier further clusters the plurality of system nodes based at least in part on criticality of processing load at the plurality of system nodes of the distributed system.

11. The apparatus of claim 9 wherein the machine learning-based classifier comprises a k-nearest neighbor dynamic time-based classifier.

12. The apparatus of claim 1 wherein determining the second one of the plurality of monitoring nodes to transition to the primary monitoring role at the given time is performed responsive to detecting a failure of the first one of the plurality of monitoring nodes having the primary monitoring role at the given time.

13. The apparatus of claim 12 wherein detecting failure of the first one of the plurality of monitoring nodes is based at least in part on the second one of the plurality of monitoring nodes not receiving at least a designated threshold number of heartbeat messages from the first one of the plurality of monitoring nodes.

14. The apparatus of claim 1 wherein determining the second one of the plurality of monitoring nodes to transition to the primary monitoring role at the given time is performed responsive to detecting that the first one of the plurality of monitoring nodes having the primary monitoring role at the given time has a lower ranking in the time-based ranking of the plurality of monitoring nodes for the given time than the second one of the plurality of monitoring nodes.

15. A computer program product comprising a non-transitory processor-readable storage medium having stored therein program code of one or more software programs, wherein the program code when executed by at least one processing device causes the at least one processing device to perform steps of:

in a monitoring system comprising a plurality of monitoring nodes in which at any given time at least one of the plurality of monitoring nodes has a primary monitoring role responsible for monitoring operation of a plurality of system nodes of a distributed system and two or more other ones of the plurality of monitoring nodes have a secondary monitoring role responsible for monitoring operation of said at least one of the plurality of monitoring nodes having the primary monitoring role, identifying at least a first one of the plurality of monitoring nodes having the primary monitoring role at a current time;

determining, based at least in part on a time-based ranking of the plurality of monitoring nodes, a second one of the plurality of monitoring nodes having the secondary monitoring role in the monitoring system at the current time to transition to the primary monitoring role, the time-based ranking of the plurality of monitoring nodes comprising rankings of the plurality of monitoring nodes for each of two or more different time ranges, the rankings being based at least in part on (i) processing load of the plurality of system nodes in each of the two or more different time ranges and (ii) latency between respective ones of the plurality of monitoring nodes and respective ones of the plurality of system nodes; and transitioning the second one of the plurality of monitoring nodes to the primary monitoring role at a subsequent time;

wherein determining the second one of the plurality of monitoring nodes to transition to the primary monitoring role at the subsequent time comprises selecting the second one of the plurality of monitoring nodes to reduce a predicted latency between the second one of the plurality of monitoring nodes and a first subset of the plurality of system nodes at the subsequent time, the first subset of the plurality of system nodes having a first predicted processing load at the subsequent time that is different than a second predicted processing load of a second subset of the plurality of system nodes at the subsequent time.

16. The computer program product of claim 15 wherein determining the second one of the plurality of monitoring nodes to transition to the primary monitoring role at the given time is performed responsive to detecting a failure of the first one of the plurality of monitoring nodes having the primary monitoring role at the given time, and wherein detecting failure of the first one of the plurality of monitoring nodes is based at least in part on the second one of the plurality of monitoring nodes not receiving at least a designated threshold number of heartbeat messages from the first one of the plurality of monitoring nodes.

17. The computer program product of claim 15 wherein determining the second one of the plurality of monitoring nodes to transition to the primary monitoring role at the given time is performed responsive to detecting that the first one of the plurality of monitoring nodes having the primary monitoring role at the given time has a lower ranking in the time-based ranking of the plurality of monitoring nodes for the given time than the second one of the plurality of monitoring nodes.

18. A method comprising:

in a monitoring system comprising a plurality of monitoring nodes in which at any given time at least one of the plurality of monitoring nodes has a primary monitoring role responsible for monitoring operation of a plurality of system nodes of a distributed system and two or more other ones of the plurality of monitoring nodes have a secondary monitoring role responsible for monitoring operation of said at least one of the plurality of monitoring nodes having the primary monitoring role, identifying at least a first one of the plurality of monitoring nodes having the primary monitoring role at a current time;

determining, based at least in part on a time-based ranking of the plurality of monitoring nodes, a second one of the plurality of monitoring nodes having the secondary monitoring role in the monitoring system at the current time to transition to the primary monitoring role, the time-based ranking of the plurality of monitoring nodes comprising rankings of the plurality of monitoring nodes for each of two or more different time ranges, the rankings being based at least in part on (i) processing load of the plurality of system nodes in each of the two or more different time ranges and (ii) latency between respective ones of the plurality of monitoring nodes and respective ones of the plurality of system nodes; and transitioning the second one of the plurality of monitoring nodes to the primary monitoring role at a subsequent time;

wherein determining the second one of the plurality of monitoring nodes to transition to the primary monitoring role at the subsequent time comprises selecting the second one of the plurality of monitoring nodes to reduce a predicted latency between the second one of the plurality of monitoring nodes and a first subset of the plurality of system nodes at the subsequent time, the first subset of the plurality of system nodes having a first predicted processing load at the subsequent time that is different than a second predicted processing load of a second subset of the plurality of system nodes at the subsequent time; and wherein the method is performed by at least one processing device comprising a processor coupled to a memory.

19. The method of claim 18 wherein determining the second one of the plurality of monitoring nodes to transition to the primary monitoring role at the given time is performed responsive to detecting a failure of the first one of the plurality of monitoring nodes having the primary monitoring role at the given time, and wherein detecting failure of the first one of the plurality of monitoring nodes is based at least in part on the second one of the plurality of monitoring nodes not receiving at least a designated threshold number of heartbeat messages from the first one of the plurality of monitoring nodes.

20. The method of claim 18 wherein determining the second one of the plurality of monitoring nodes to transition to the primary monitoring role at the given time is performed responsive to detecting that the first one of the plurality of monitoring nodes having the primary monitoring role at the given time has a lower ranking in the time-based ranking of the plurality of monitoring nodes for the given time than the second one of the plurality of monitoring nodes.

* * * * *